United States Patent [19]
Ridgway

[11] Patent Number: 5,629,797
[45] Date of Patent: May 13, 1997

[54] AUTOSTEREOSCOPIC IMAGE SYSTEM

[76] Inventor: Michael Ridgway, 9 Richard Moss House, St. Peter Street, Winchester, Hants, 50238BT, England

[21] Appl. No.: 433,065

[22] Filed: May 3, 1995

[51] Int. Cl.[6] .................................................. G02B 27/22

[52] U.S. Cl. .......................... 359/464; 359/462; 359/465; 359/466; 359/475; 349/62; 349/96

[58] Field of Search ................................... 359/462, 464, 359/465, 466, 467, 468, 469, 475, 477, 41, 42, 48, 49, 63

[56] References Cited

U.S. PATENT DOCUMENTS

| 4,853,769 | 8/1989 | Kollin | 358/88 |
| 5,036,385 | 7/1991 | Eichenlaub | 358/3 |
| 5,113,285 | 5/1992 | Franklin et al. | 359/465 |
| 5,264,964 | 11/1993 | Faris | 359/465 |
| 5,500,765 | 3/1996 | Eichenlaub | 359/463 |

*Primary Examiner*—Brian Healy

[57] ABSTRACT

An autostereoscopic image system involving a composite picture, a second filter containing horizontal alternately polarized and/or colored bands and a first filter containing vertical alternately polarized and/or colored bands. The first filter may be covered by a lenticular screen through which the image is perceived. The invention can bring about an improvement in the image depth and range of viewing angle of 3-D lenticular pictures.

12 Claims, 7 Drawing Sheets

5,629,797

1

AUTOSTEREOSCOPIC IMAGE SYSTEM

BACKGROUND TO THE INVENTION

This invention relates to methods of producing autostereoscopic images that utilize a set of narrow vertical in apertures or a set of narrow vertical cylindrical lenses order to produce the stereoscopic effect such as a 3-D lenticular picture.

In a typical 3-D lenticular picture a series of picture elements are positioned behind a lenticular screen consisting of a series of narrow cylindrical lenses. One limitation associated with this technique is caused by the fact that each vertical picture element of the composite picture cannot be any wider than its corresponding lens element and this limits the range of viewing angle and potential depth of field of the picture.

OBJECTS OF THE INVENTION

It is an object of the present invention to provide more horizontal space (than available in prior art) that can be viewed via each lens element of a lenticular screen (or narrow vertical apertures in other types of screen) in order to enhance the stereoscopic effect and/or to increase the range of viewing angle before aberrations in the picture.

It is also an object of this invention to provide a system that can be used in conjunction with cinematographic back projection to create an autostereoscopic moving picture.

SUMMARY OF THE INVENTION

The autostereoscopic picture of this invention is provided with the use of a lenticular screen (or other type of screen containing a set of narrow vertical apertures) and two filters which may be polarized and/or colored. Each filter contains alternating bands of polarization and/or colour and the first filter is positioned behind the lenticular screen with a band of polarization or colour positioned behind each lens element of the lenticular screen.

A second filter is positioned behind the first filter. The second filter also contains narrow bands of alternating polarisation and/or colour in which the bands are disposed horizontally. There is a gap between the first and second filter and the second filter is positioned against an array of lenticular type picture elements in a configuration that is aligned to the first and second filters.

In the case of this invention being used for cinematographic effects, the second filter may include a liquid crystal shutter system consisting of an array of narrow horizontal liquid crystal elements that are switched in synchronism with pictures that are back projected onto a screen behind the L.C. shutter.

BRIEF DESCRIPTION OF DRAWINGS

The present invention will be more fully understood by reference to the following detailed description and when read in conjunction with the accompanying drawings wherein.

2

Figure 4:
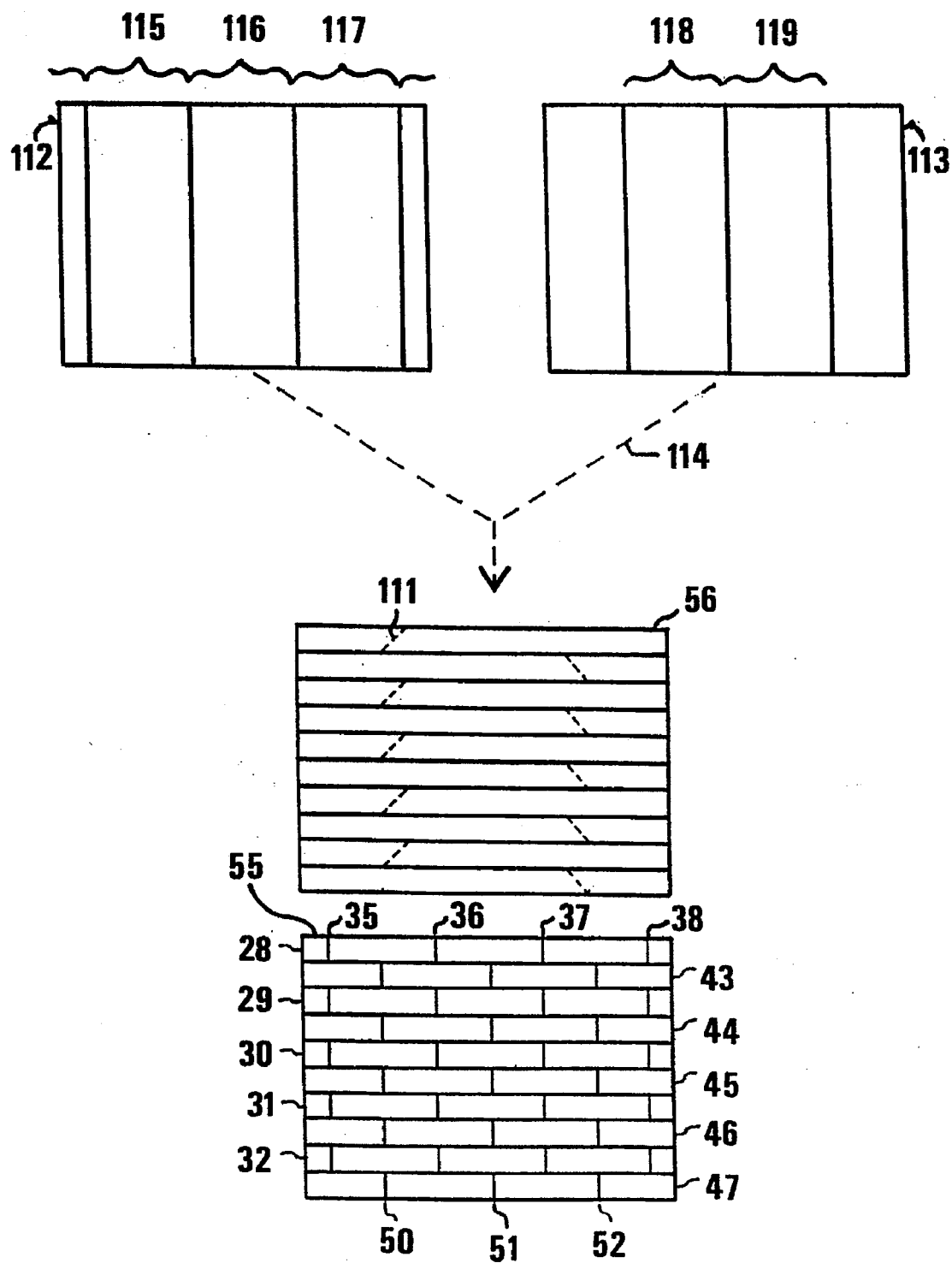

FIG. 4 illustrates the construction of the composite print and when reference is made to cinematographic back projection, the function of the liquid crystal shutter system and low the shutter system relates to the composite pictures as they appear on the screen.

Figure 5:
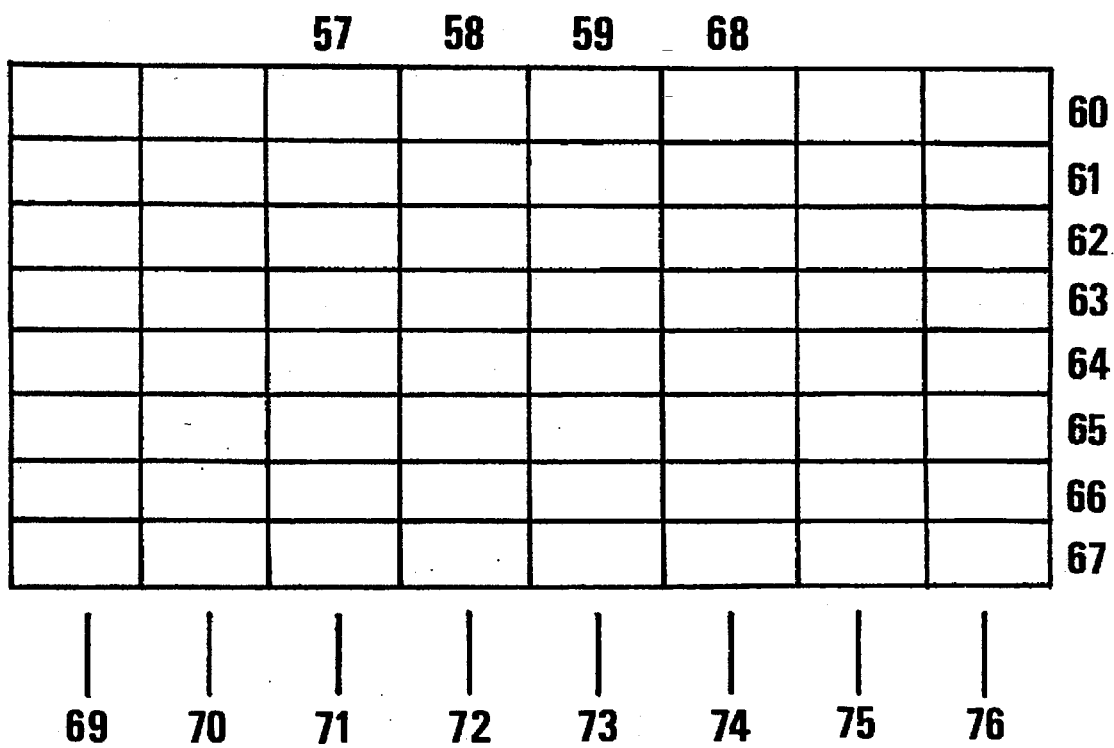

FIG. 5 illustrates an organisation of bands of color and polarization when color exclusion is used in addition to polarized exclusion.

Figure 6:
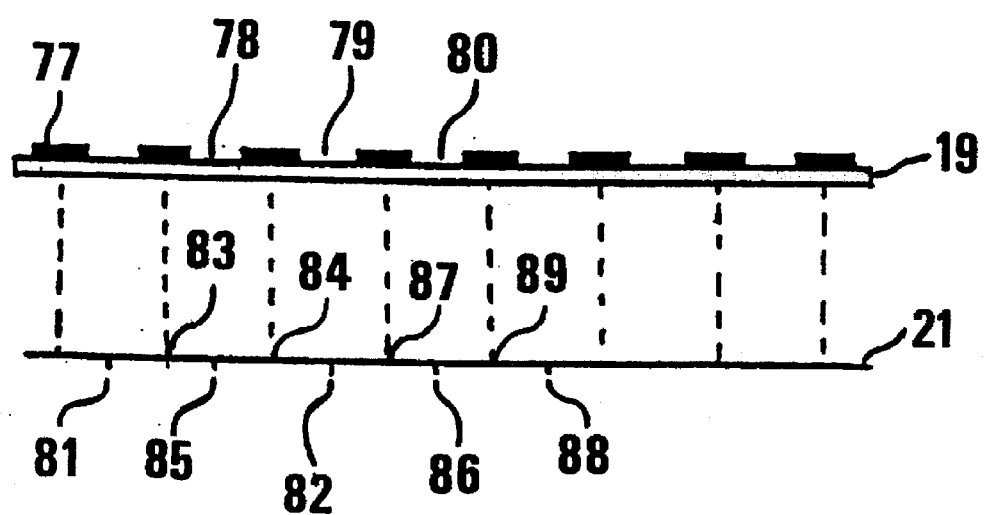

FIG. 6 illustrates how the present invention can be used to increase the range of horizontal viewing angle in a prior art system using non-transparent lines instead of a lenticular screen.

Figure 7:
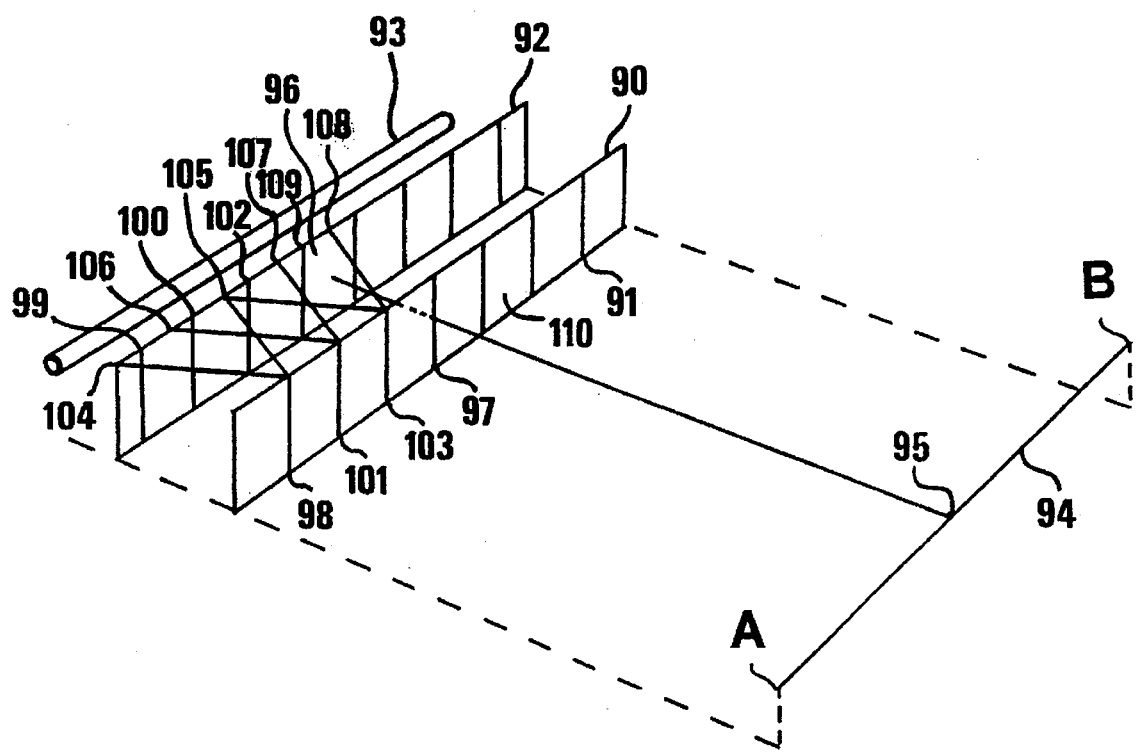

FIG. 7 illustrates how the present invention can be used to widen the illusionary image in the prior art sign system for observers in relative motion.

DETAILED DESCRIPTION OF THE INVENTION

Figure 1:
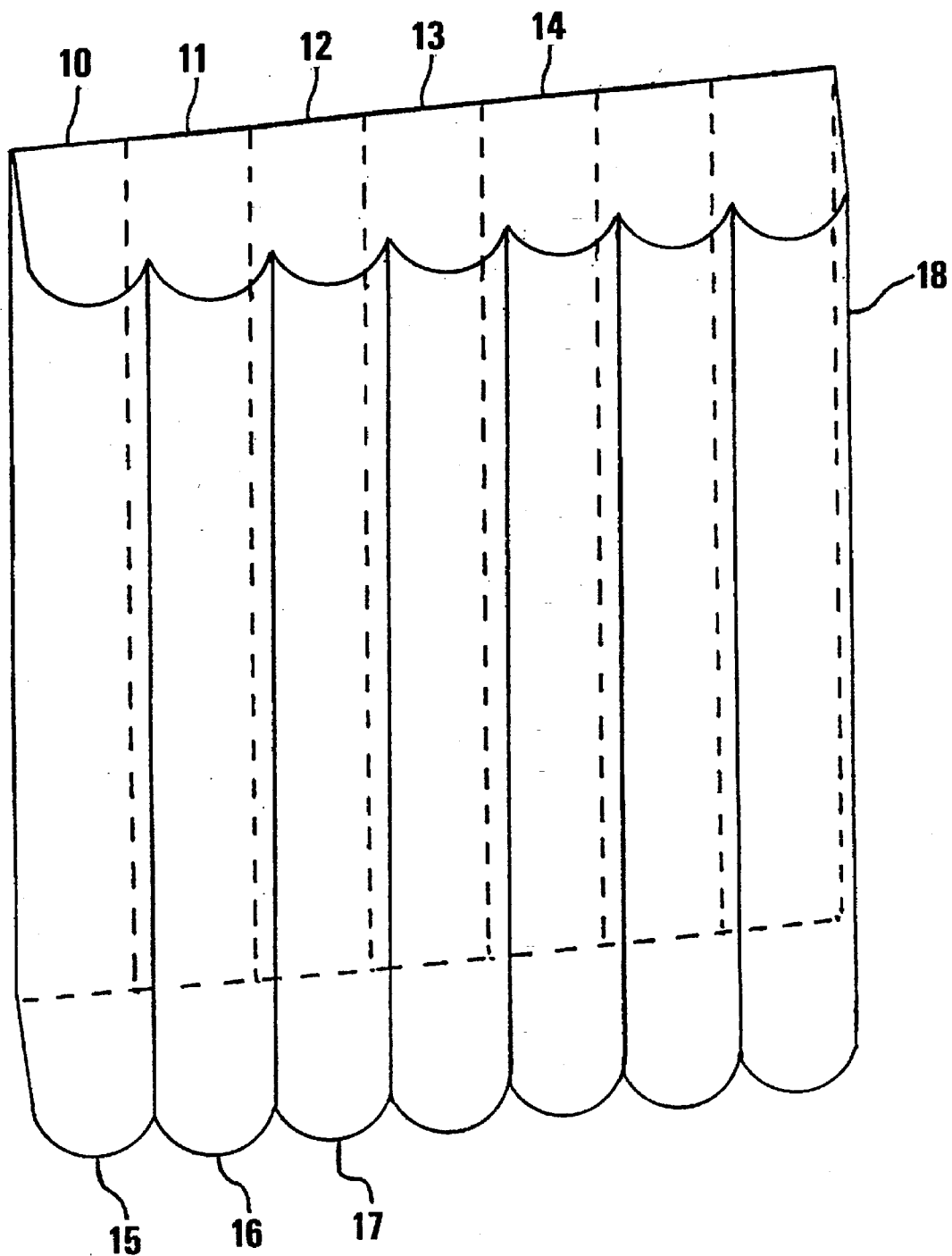
FIG. 1 illustrates a perspective view of prior art and which demonstrates the limited picture element width behind each corresponding lens element of the lenticular screen.

See FIG. 1 which is a perspective view of prior art in which each lenticular picture element, one of which is 10 is positioned directly behind a corresponding lens element, one of which is 15 of a lenticular screen 18.

An ideal viewing position of 90 degrees to the screen will provide a stereoscopic picture in which picture element 10 is exclusively visible through lens element 15, picture element 11 is exclusively visible through lens element 16 and picture element 12 is exclusively visible through lens element 17. However if the observer moves to a diagonal position a view of adjacent picture elements will progressively become visible through each lens element. Thus picture element 12 may progressively become more visible through lens element 16 and picture element 13 may progressively become more visible through lens element 17 as the observer moves to the left. This causes an aberration in the picture as the view shifts to the adjacent picture elements until there is a complete transition to the adjacent picture elements, i.e. picture element 12 is solely visible through lens element 16 and picture element 13 is solely visible through lens element 17 whereupon the stereoscopic properties of the picture are reinstated.

The problem with this arrangement is that (a) there is an aberration in the picture when the observer moves to a diagonal position (b) the early loss of stereoscopy with a change of angle of view and the fact that the reinstated image is just a repeat of the earlier image (and not a view of further round the object) undermines the illusory effect of a real object and (c) the limited width of each picture element limits the stereoscopic potential of the system.

Figure 2:
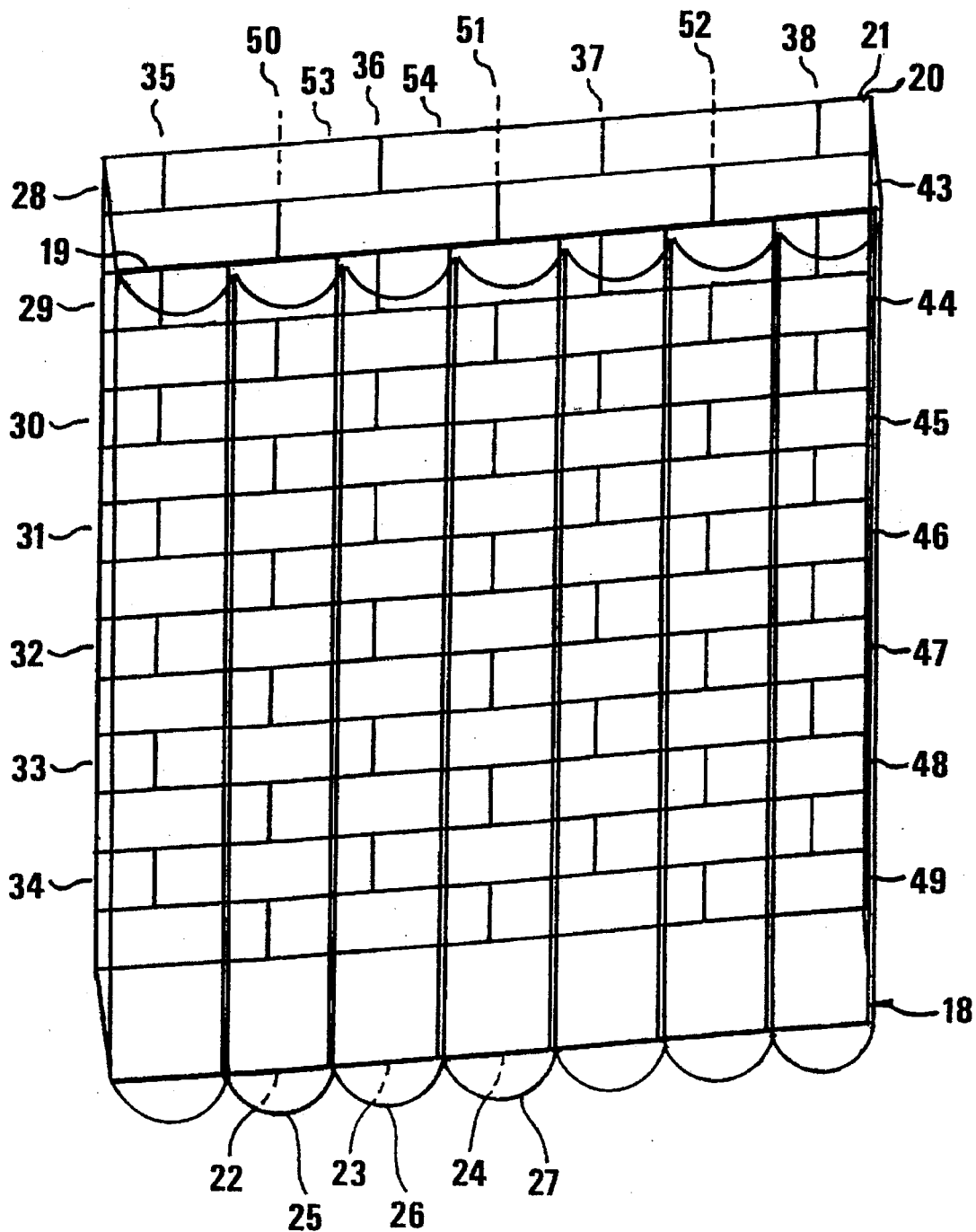
FIG. 2 illustrates a perspective view of one embodiment of the present invention.
Figure 3:
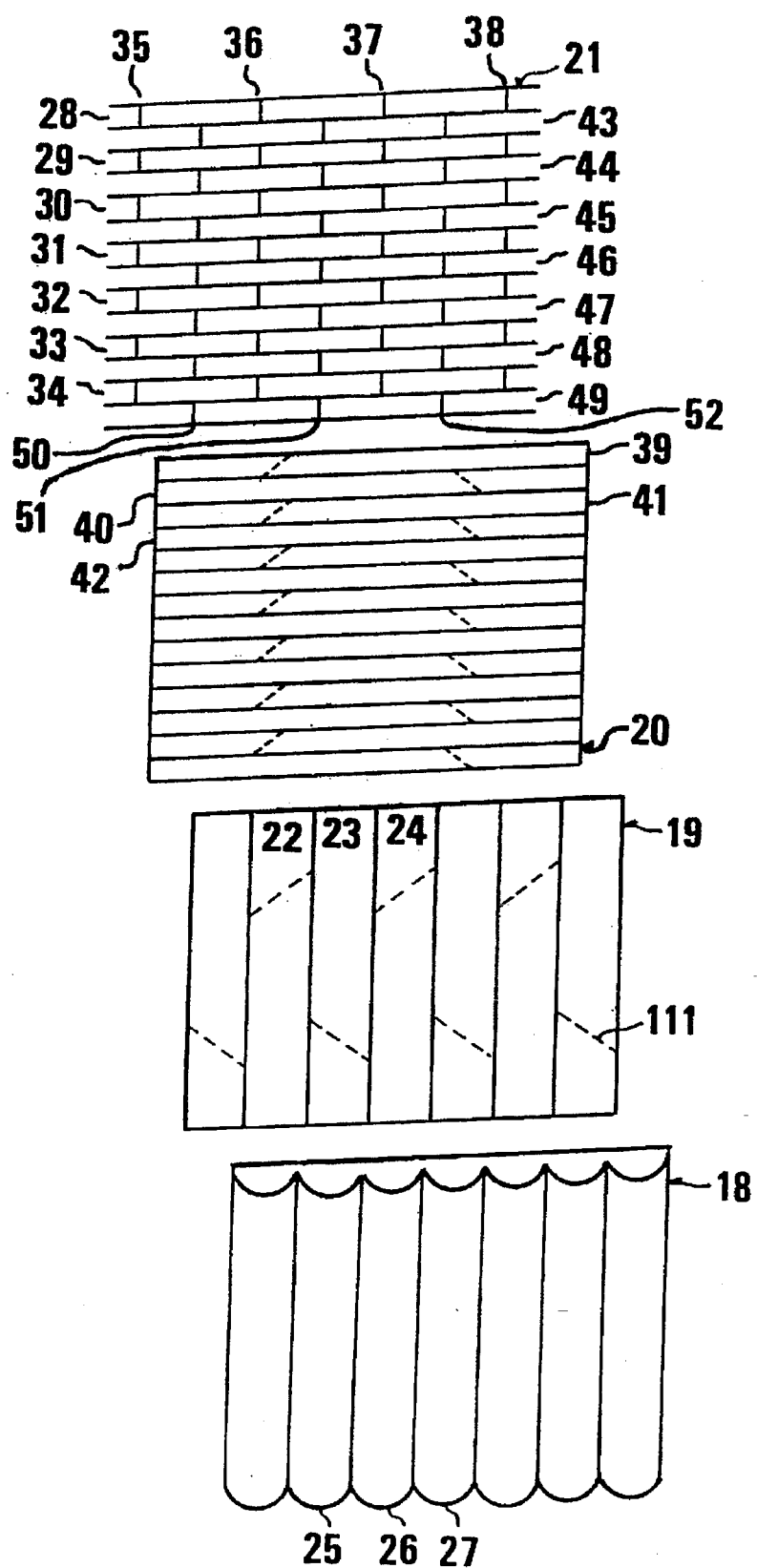
FIG. 3 illustrates a blown up version of FIG. 2 in order to demonstrate clearly the function and relationship of the various component parts.

See FIG. 2 which, represents a perspective view of one embodiment of the present invention and FIG. 3 is an exploded version of FIG. 2 in order to more clearly demonstrate the configuration of the various component parts in which 18 is the lenticular screen, 19 is the first filter consisting of an array of vertical alternating polarized bands and 20 is the second filter consisting of an array of horizonal alternating polarized bands. 21 is the composite picture in the form of a transparency containing the array of picture elements to be viewed through filters 19 and 20 and lenticular screen 18.

The polarization of the bands of the first filter and second filter 20 is indicated by diagonal hyphenated lines, one of which is 111.

With respect to first filter 19, the vertical polarized bands of the first filter, one of which is 22, is the same width as the lens elements of the lenticular screen 18. Each polarized band is oppositely polarized with its adjacent band. Thus 22 may be polarized 45 degrees to the right and 23 may be polarized 45 degrees to the left and band 24 may be polarized 45 degrees to the right and so on.

As the width of each band of the first filter 19 corresponds with the width of each lens element of the lenticular screen 18, each lens element (one of which is 25) will have an exclusive view through a particular band of the first filter 19.

As a consequence, each lens element of the lenticular screen will be oppositely polarized to the immediately adjacent lens elements. Thus lens element 26 will be oppositely polarized to lens elements 25 and 27.

The second filter 20 consists of horizontally polarized bands that are oppositely polarized in the same manner as the first filter 19. The thickness of the bands do not need to be the same as the bands of the first filter 19 and in the case of the drawing the bands are thinner. The bands of the second filter need to be sufficiently thin not to be visible or unduly visible and as such may be the same width or thinner than the bands of the first filter 19.

The polarization of the bands of the second filter 20 corresponds with the polarization of the bands of the first filter 19 in that 50% of the bands of the second filter will cross polarize with 50% of the bands of the first filter and the remaining 50% of the bands of the second filter will cross polarize with the remaining 50% of the bands of the first filter. As a consequence, the view through lens element 25 will have light through each alternate band of the second filter 20 all of which are not cross polarized with band 22 of the first filter 19 which is lined up with lens element 25.

The view through lens element 26 however will provide a view of the alternate set only of the bands of the second filter 20 because the first filter band 23 is oppositely polarized to first filter band 22.

Composite picture 21 contains two picture sets each of which is positioned to be visible through an alternate set of lens elements via the two filters 19 and 20.

The first composite picture set is positioned in a scheme of alternate bands 28 to 34. The width of the picture elements of the first composite picture set are from 35 to 36, 36 to 37 and 37 to 38. The bands of the two sets of the composite picture correspond with the horizonal bands of the first filter. Thus 28 of the first composite set is aligned with 39, 29 of the first composite set is aligned with 41 etc.

The second set of the composite picture is divided up into the remaining alternate bands 43 to 49 and the width of each picture element of the second set of the composite picture is from 50 to 51 and 51 to 52.

The second filter is placed against the complete composite picture (containing both first and second composite picture sets). A gap is provided between second filter 20 and first filter 19. This may take the form of transparent plastic. First filter 19 is placed sufficiently close to the lens elements of the lenticular screen 18 in order to sufficiently isolate each lens element.

(It should be noted that the nearer the first filter 19 is to the lens elements, the greater the effect of limiting the light through each lens element to that of the correct polarization and therefore the lenticular screen should contain as little as possible non-lens base substrate prior to the connection of the first filter to bring the bands of the first filter as close as possible to the lens elements.

The first filter 19 can be sandwiched within the lenticular screen during the course of manufacture of the screen with the lens elements on the front surface and a transparent plastic substrate connected to the other side of the first filter 19. The thickness of the substrate may form an appropriate distance between the lens elements and second filter 20 adequately magnify the picture elements of the composite picture 21).

The component parts are lined up so that picture element 35 to 36 is visible through lens element 25. This occurs because horizonal band 39 of the second filter 20 is equally polarized to the vertical band 22 of first filter 19. This enables lens element 25 to have a view of picture element 35 to 36 that extends down the vertical length of the picture from 28 to 34.

As picture element 50 to 51 is positioned behind the horizontal band of the second filter 40 and the polarization of this band corresponds with band 23 of the first filter 19, this picture element 50 to 51 will be visible through lens element 26 but not through lens elements 25 and 27.

The principle extends throughout and enables the view from each lens element to be twice the width of the prior art and hence, twice the stereoscopic potential and twice the width of viewing angle before aberrations in the picture.

See FIG. 2 in which it is possible to see that the range of horizontal view through lens element 26 is from 50 to 51 instead of 53 to 54 as would be the case in prior art.

As the filters of this invention reduce light, more light is required to illuminate the picture.

The composite picture is formed using principles of lenticular picture formation and the horizontal bands of the image may be divided up using a mask of narrow opaque lines of the same proportions as the lines of the second filter 20 or the composite picture images may be presented to the unexposed film through a polarized filter of the proportions of the second filter 20.

See FIG. 4 which illustrates the transparency film 55, a polarized filter 56 containing horizontal bands and the first composite picture set 112 and the second composite picture set 113. The polarized filter corresponds with the second filter 20 in FIG. 3, and may represent the very same filter. The film 55 and filter 56 may be made as a single item in that the filter 56 is treated to be photosensitive on one side (so that it can be exposed through the filter side). Alternatively the filter 56 may be stuck to film 55.

However, by connecting the two together in whichever way, it is possible to isolate the horizontal bands (28 to 32 and 43 to 47) of the completed composite picture by exposing the film 55 through the filter side 56 with exposures to the first and second composite sets 112 and 113 with two polarizations of light, one for each composure set (112 and 113).

The first composite picture set 112 contains a large number of picture elements three of which are 115, 116 and 117. The second composite picture set 113 contains a large number of picture elements, two of which are 118 and 119.

Each composite picture set (112 and 113) contains picture elements that are like a composite picture of a 3-D lenticular picture in prior art, however the two composite picture sets 112 and 113 are related to one another insofar as each contains the alternate images that are missing in the other.

Thus picture element 115 represents the first complete picture element in the illustration that contains a view of the scene or object that is furthest to the left but the next view to the right of 115 is not 116 but 118 of the second composite picture set 113. The sequence of progressive views to the right continues from 118 to 116 to 119 to 117.

The first composite picture set 112 is exposed to the film 55 through filter 56 using polarized light bringing about an exposure of the film 55 in bands 28 to 32 to picture elements 115, 116 and 117 of the first composite picture set 112. Thus 115 is exposed to 35 to 36, 116 is exposed to 36 to 37 and 117 is exposed to 37 to 38. Bands 43 to 47 remain unexposed at this stage.

There then follows an exposure of the second composite picture set 113 to the remaining bands of the film 55 which are 43 to 47. This is done with oppositely polarized light through filter 56. This exposure exposes picture elements 118 to 50 to 51 and 119 to 51 to 52 in bands 43 to 47.

As picture elements 35 to 36, 36 to 37 and 37 to 38 are going to have horizontal bands 43 to 47 taken from the picture elements, there is a consequential loss of 50% of the picture, however this represents a loss of vertical definition which can easily be afforded if there is a general good quality of photographic imagery.

The vertical definition is traded in for more horizontal angle of view which is provided in this invention.

In the event of cinematographic uses of the invention, the images may be projected onto a screen—i.e. a translucent screen suitable for receiving back projected images as in the case of a video projector or a cine film projector or the screen may be a flat LCD TV screen or the screen of a cathode ray tube.

Positioned over the front surface of the screen is placed a liquid crystal shutter system and second filter combination consisting of narrow horizontal bands that can be opened and closed electronically; when open, each element polarizes light in accordance with a second filter as previously described. The L.C. shutter system thus functions as the second filter in this invention but has the added electronic feature of the horizontal L.C. shutter elements being closeable to light separately to the effect of polarization (when open).

The function of the L.C. shutter can be explained with reference to FIG. 4 in which 55 can be understood to be the L.C. shutter system and second filter combination. L.C. elements 28 to 32 are switched to be open when an image appears on the screen that conforms to a first composite picture set 112.

These elements 28 to 32 are then closed and elements 43 to 47 are opened in synchronism with the second image that appears on the screen conforming to the second composite picture set 113. Two sets of images (112 and 113) thus appear on the screen behind the L.C. shutter system and second filter combination for each still picture of the film, one for bands 28 to 32 and the other for bands 43 to 47 providing all the visual information required in the system and therefore a film running at 25 frames per second will have 50 images presented in one second, two images for each frame.

The advantages of the present invention being used for back projected cinematographic effects are that (as explained with reference to other examples) the lenticular screen will have twice the stereoscopic potential and range of viewing angle compared to prior art and because of the greater horizontal scope and vertical scope with respect to picture position, the positioning of the projected picture on the screen can be less critical.

The vertical scope comes about because the composite pictures projected onto the screen behind the L.C. shutter system need not be divided up into horizontal bands before this is done by the L.C. shutter system, See FIG. 5 which extends the principle utilizing color exclusion in addition to polarized exclusion in possible embodiments of this invention. By adding red and blue (or red and green) it is possible to extend the view through each lens element to that of four times the width of the lens element.

60 to 67 represent the horizontal bands of the second filter. 60 is red and polarized 45 degrees to the right. 61 is blue and also polarized 45 degrees to the right, 62 is red and polarized 45 degrees to the left and 63 is blue and polarized 45 degrees to the left. Subsequent bands continue in that order down the length of the picture.

The vertical lines represent the boundary of the vertical bands in the first filter.

In this example band 57 is red and polarized 45 degrees to the right, 58 is blue and polarized 45 degrees to the right. 59 is red and polarized 45 degrees to the left and 65 is blue and polarized 45 degrees to the left.

Thus 57 excludes all light except from bands 60 and 65 because it excludes the blue color of 61, the opposite polarization of 62 and the opposite polarization and blue color of 63. 58 excludes all but 61 and 65 because of the red color of band 60, the opposite polarization and color of 62, the opposite polarization of 65 and the red of Utilizing the same principle, 59 excludes all bands but 62 and 66, and 68 excludes all but 63 and 67.

As a consequence lens element positioned at 57 will provide a view of a corresponding picture element between 69 and 73 and lens element positioned at 58 will provide a view of a corresponding picture element between 70 and 74. Lens element at position 59 will provide a view of a corresponding picture element between 71 and 75 and lens element at 68 will provide a view of a corresponding picture element between 72 and 76.

The invention may include vertical non-transparent lines (as in U.S. Pat. No. 5,035,929) on the surface of the second filter as a substitute to a lenticular screen.

See FIG. 6 in which 77 is one of the vertical non-transparent lines printed on the surface of the first filter 19.

In between each line 77 is a transparent section containing the polarized and/or coloured surface one of which is 78.

Thus, by way of utilising the principles of the invention, the view through aperture 78 can be from 81 to 82 instead of 83 to 84 and the view from 79 can be from 85 to 86 instead of 84 to 87. The view through aperture 80 can be from 82 to 88 instead of 87 to 89.

The present invention can be used to increase the width of the image in the sign for observers in relative motion described in UK patent application GB 2234363A. Among other uses, this system can be positioned on tunnel walls for people in passing trains or alongside rides in leisure parks to provide simulated passing views.

See FIG. 7 in which 90 is the aperture plate positioned at the front of the unit. Contained within the aperture plate are a row of vertical slits, one of which is 91. In between each slit is a non-transparent area which may be black 110. Behind the aperture plate is the image plate 92 containing a row of images in a transparency form.

The images are lit from behind from light source 93. 94 is the line of travel between A and B. 95 is a position along the line of travel 94 from which the observer will have a view of a part of an image situated at position 96 through slit 97.

As the observer moves from A to B the images in image plate 92 will combine and will appear to have a distance which is different to the actual distance of the image plate and the illusionary image can also have stereoscopic properties because of the way the brain builds up an illusionary impression through persistence of vision and a changing angle of view.

In the prior art each image will not be wider than the distance between each adjacent slit 91. Thus the image for slit 98 will be from 99 to 100 and the image for slit 101 will be from 100 to 102 and the image for slit 103 will be from 102 to 109. However by utilising the principles contained within the present invention, it is possible to increase the width of each image using polarized and/or colored filters and horizontally dividing the images in the image plate accordingly.

Thus, if each successive slit 91 is alternately polarized i.e. if slit 101 is oppositely polarized to slits 98 and 103, and 103 is oppositely polarized to 101 and 97, the size of the image per slit can be increased so that slit 98 can have a corresponding image from 104 to 105 and slit 101 can have an image from 106 to 107 and slit 103 can have an image from 105 to 108.

This is because the image plate 92 combines as a second filter or contains a second filter on it or within it and adjacent images are organised in relation to the filter in ways described earlier with reference to the drawings.

Thus the images on the image plate are overlapping in horizontal bands (the bands of which are narrow enough not to be noticeable or unduly noticeable).

The horizontal bands can be polarized and/or colored and in the case of this example they should be understood to be polarized. The polarization covers the front surface of the image plate so that the correct image is designated for the correct slit.

The first and second filter in this invention can involve exclusively color exclusion just as the filters can involve exclusively polarized exclusion.

When color exclusion is used, i.e. red v. blue for color images or red v. green for monochrome, both the composite print and the filters or filter can be printed on acetate providing an economic way of producing an autostereoscopic display. The color of the print provides the appropriate exclusion of light.

An exclusively colour based system does not necessarily require a first filter as such because the composite print of the original image can be colored in an appropriate manner to bring about color exclusion when combined with the coloured second filter. In this case the composite picture can be printed on one side of a piece of acetate (or other type of transparent sheet) and the second filter may be printed on the other side of the acetate.

The acetate providing the optical gap between the composite print (which does not require a first filter because it is colored accordingly) and the 'second' filter.

It is possible to obtain a stereoscopic effect utilising the fist filter 19 only on the front surface without a lenticular screen 18 or other type of screen as the width of the picture elements are wider that the bands of the first filter and a different angle of horizontal view (i.e. a different eye position) will provide a differing view of each picture element.

Therefore, in any example in this specification where a lenticular screen is indicated, a lenticular screen may not be used and the principles of the present invention still apply. However a lenticular screen can provide greater enhancement of the image because of the magnifying effect of the lens elements.

Versions of the invention can include color exclusion and/or polarized exclusion conforming to the principles of the invention. The composite print may be mounted or attached to any suitable substance such as film acetate or glass. A light box or other light source may be used for back lighting the display but versions of the invention can be made for existing light sources such as a version of transparency composite print, first filter (if required) and second filter with transparent substrate (i.e. piece of acetate) which are bonded together in a single sheet and prepared with a sticky surface on one side to make a window sticker for which the light source may be daylight or ambient light from within a room.

I claim:

1. An autostereoscopic image system comprising; the first filter containing vertical bands of alternating polarization behind which is positioned the second filter containing horizontal bands of alternating polarization behind which is positioned the composite picture with picture elements arranged to be viewed through the combination of both first and second filters and producing an autostereoscopic effect when viewed through the filters.

2. The autostereoscopic image system of claim 1 in which a lenticular screen is attached to the front of the first filter so that each lens element of the lenticular screen is positioned directly in front of each vertical polarized band of the first filter.

3. The autostereoscopic image system of claim 1 in which the composite picture is in the form of a transparency and the system is mounted on a light box providing back illumination.

4. The autostereoscopic image system of claim 2 in which the composite picture is in the form of a transparency and the system is mounted on a light box providing back illumination.

5. The autostereoscopic image system of claim 1 in which the bands of the first and second filters contain color exclusion in addition to polarized exclusion.

6. An autostereoscopic image system of claim 1 in which the bands of the first and second filter contain color exclusion exclusively.

7. An autostereoscopic image system of claim 6 in which the composite picture is printed on one side of a piece of acetate (or other transparent material) and the colored bands of the first filter are printed on the other side of the acetate; the second filter not being included because the composite picture is colored to correspond correctly with the first filter.

8. An autostereoscopic image system of claim 7 in which one side of the acetate is provided with a sticky surface in order that it can be used as a window sticker.

9. An autostereoscopic image system of claim 1 in which the second filter is combined with an L.C. shutter system containing horizontal elements that are switched in synchronizm with first and second composite sets that appear on a screen behind the L.C. shutter and second filter combination, providing a method of producing a cinematographic autostereoscopic image.

10. An autostereoscopic image system of claim 9 in which a lenticular screen is attached to the front of the first filter so that each lens element of the lenticular screen is positioned directly in front of each vertical polarized band of the first filter.

11. An autostereoscopic image system of claim 1 in which regularly positioned vertical non-transparent lines are printed on the front of the first filter as an alternative to a lenticular screen.

12. An autostereoscopic image system of claim 1 in which the composite picture forms the image on the image plate of the sign for observers in relative motion and the second filter principle is applied to the aperture plate so that each slit is polarized accordingly bringing about a wider view of the illusionary image.

* * * * *